United States Patent [19]

Spencer

[11] Patent Number: 5,524,769

[45] Date of Patent: Jun. 11, 1996

[54] COUNTERFLOW AGGREGATE RECOVERY APPARATUS

[76] Inventor: James A. Spencer, 2911 Renfro Rd., Jefferson City, Tenn. 37760-5423

[21] Appl. No.: 305,591

[22] Filed: Sep. 14, 1994

[51] Int. Cl.$^6$ ...................................................... B07B 1/22
[52] U.S. Cl. .......................... 209/270; 209/284; 209/288; 209/293; 209/689
[58] Field of Search .................................... 209/270, 284, 209/285, 288, 293, 296, 297, 689

[56] References Cited

U.S. PATENT DOCUMENTS

| | | | |
|---|---|---|---|
| 1,460,463 | 7/1923 | Williams . | |
| 2,807,364 | 9/1957 | Suddreth | 209/75 |
| 2,942,731 | 6/1960 | Soldini | 209/270 X |
| 2,973,093 | 2/1961 | Erickson | 209/106 |
| 4,127,478 | 11/1978 | Miller | 209/270 X |
| 4,178,238 | 12/1979 | Harris | 209/270 |
| 4,386,695 | 6/1983 | Olson | 198/661 |
| 4,479,048 | 10/1984 | Kinoshita | 219/388 |
| 4,616,786 | 10/1986 | Riker | 241/35 |

OTHER PUBLICATIONS

Brochure Packet on Enviro–Matic Reclamation Systems, Stephens Mfg Co. Aug. 2, 1993.
Brochure on Enviro–Port, Inc. Reclamation Systems, A Metz Company.
Brochure on Recycle System 3 by JH Systems, J&H Equipment, Inc. 1991.
Brochure on Haahjem Roto–Reclaimer by Haahjem North America, Inc.
Brochure on Bibko Recycling System by R. J. Miller Company, Sep. 1993.

*Primary Examiner*—David H. Bollinger
*Attorney, Agent, or Firm*—Pitts & Brittian

[57] ABSTRACT

A counterflow aggregate recovery apparatus for separating and retrieving material. The recovery apparatus includes a rotatable drum in which a cylindrical screen is suspended. The material to be processed is introduced into the cylindrical screen. The screen permits the passage of material smaller than the openings defined by the screen. The material which passes through the cylindrical screen is received within an annular volume defined between the cylindrical screen and the drum wall. A first material conveyor moves the material received within the annular volume such that the material is discharged from the second end of the drum. A second material conveyor moves the material retained by the cylindrical screen to the first end of the drum and discharges the material from the first end.

21 Claims, 3 Drawing Sheets

COUNTERFLOW AGGREGATE RECOVERY APPARATUS

TECHNICAL FIELD

This invention relates to the field of reclaiming useable material from waste and more specifically to the recovery of components of unused wet concrete.

BACKGROUND ART

Recovering useable material from waste materials is desirable when the recovered material can be reused. For example, recycling concrete saves in material costs and further eliminates the problem of disposing of waste concrete. It is well known that when pre-mixed concrete is delivered to a job site, an amount in excess of that estimated is delivered. Thus, there is typically an amount of wet concrete remaining which must either be wasted or reclaimed.

Several devices have been produced to reclaim a variety of materials. Typical of the art are those devices listed below.

| U.S Pat. No. | Inventor | Date |
| --- | --- | --- |
| 1,460,463 | O. W. Williams | Jul. 3, 1923 |
| 2,807,364 | W. E. Suddreth | Sep. 24, 1957 |
| 3,973,093 | L. C. Erickson | Feb. 28, 1961 |
| 4,479,048 | T. Kinoshita | Oct. 23, 1984 |
| 4,616,786 | R. Riker | Oct. 14, 1986 |

U.S. Pat. No. 1,460,463 discloses a grain separator wherein two rotary drums, one over the other, are utilized to separate material by size. The material is initially separated in the top drum by the use of perforations and pockets in the wall of the drum. Material collected which is in need of further processing is delivered to the lower drum where it is separated in the same fashion. The device is complex in construction. The rotary motion of the material conveyors is transmitted from a source separate from that which does controls the rotation of the drums.

U.S. Pat. No. 2,807,364 teaches a sorting device for separating screws and washers. The device includes a rotating drum which defines a plurality of perforations and hollow members which define slots. The screws pass through the perforations and the washers are passed through the slots into the hollow members. The housing of the drum is partitioned such that the screws are collected in one container and the washers are collected in another container. The device is configured to sort two specifically sized objects and is not suitable for sorting a variety of different sized materials.

U.S. Pat. No. 2,973,093 teaches a roller device with removable rolls for sorting material into fine and coarse aggregates. The rollers are elliptical in shape and each adjacent roller is 90° out of phase with respect to the next roller. The material to be sorted is fed over the rotating rollers. Fine material falls between the rollers while coarse material is moved along by the motion of the rollers. The device does not provide a means for ensuring that a substantial portion of fines is removed from the material. Further, the device is limited to sorting small batches of material at a time.

U.S. Pat. No. 4,479,048 teaches a reclaiming machine for scraps of expanded foam thermoplastic material. The device is configured to receive finely crushed material scraps. The device provides a means for heating the material and moving the material along a cylinder with a screw shaft of increasing diameter such that the material is partially melted when it reaches the second end of the cylinder. The material is subsequently discharged from the device.

U.S. Pat. No. 4,616,786 teaches a plant for processing surplus concrete. The plant includes a receiving bin equipped with a conveyor screw for moving material received in the bin to a washing apparatus. The washing apparatus contains a built-in conveyor screw for conveying sand and gravel toward the right hand end during rotation of the washing apparatus. A plurality of scooping buckets are utilized to remove the sand and gravel from the end of the washing apparatus. The plant does not provide a means for separating different sized particles.

There are several reclaiming devices presently available. The devices related to the device of the present invention are: (1) the ENVIRO-MATIC manufactured by Stephens Manufacturing; (2) the ENVIRO-PORT manufactured by Enviro-port, Inc.; (3) SYSTEM 3 manufactured by J & H Equipment Co.; (4) BIBKO Recycling System manufactured by R. J. Miller Company; and (5) ROTO-RECLAIMER manufactured by Haahjem North America, Inc.

In the ENVIRO-MATIC, rock is separated first, by a vibrating screen over a screw classifier. Sand and cement fines pass through the screen into the classifier. Sand settles and is carried up the screw classifier and discharged. The cement fines pass over adjustable weir and flow into settling ponds.

In the ENVIRO-PORT, returned concrete is dumped into steel tanks where the slurry is kept in continuous agitation. A screw conveyor at the bottom of the tank removes sand and stone. The sand and stone is cleaned and stockpiled. The slurry water is pumped at controlled rate from the slurry tank into trucks.

In System 3, the waste concrete is unloaded into a receiving bin, the aggregate and sand is sorted out via a classification screw system and the slurry is received by a sand pond and silt pond wherein any sand in the slurry and the remaining components settle out.

The BIBKO system has a trough washer which is divided into pre-wash and main-wash chambers. Fresh water flows in a direction through the machine in a direction opposite to the flow of the surplus material. Separated and washed sand and gravel are discharged by the conveyor. The recycle water is collected and stored in an agitator suspension reservoir.

The ROTO-RECLAIMER is generally comprised of a rotary screen having two sections, the wash section and the sand section. The cement slurry is washed from the aggregate in the wash section. The aggregates are separated in the sand section. A spray bar delivering high volumes of water per minute extends through the entire length of the rotary screen and assists in the washing out the cement and separating the aggregates. The sand through combination of gravity and water pressure is allowed to pass through the screen and into a sand chute. The oversized product exits the rotor and fall from the rock chute. The entire unit is inclined. The material moves through the unit due to this incline. A disadvantage in using this system is that water exits through out the entire length of the unit along with material. A receiving bin extending the length of the system must be utilized to collect the material exiting through the rotary screen. Further, only gravity is relied upon to the material through the system which may cause the processing of the material more time consuming.

Therefore, it is an object of the present invention to provide a counterflow aggregate recovery apparatus for recovering reusable components of waste concrete.

Further, it is another object of the present invention to provide an apparatus which can utilized to wash and separate crushed stone aggregates or similar material.

It is yet another object of the present invention to provide an apparatus wherein the separation factor can be altered.

It is still a further object of the present invention to provide an apparatus which has a simplified construction over devices of the prior art.

It is yet another object of the present invention to provide an apparatus which provides a means for quickly and consistently moving the material through the apparatus.

It is another object of the present invention to provide an apparatus in which the material exits from either end of the apparatus thereby reducing the space necessary for a receiving bin.

DISCLOSURE OF THE INVENTION

Other objects and advantages will be accomplished by the present invention which serves to reclaim and sort waste concrete material. The counterflow aggregate recovery apparatus of the present invention includes a rotatable drum and a cylindrical screen suspended within the rotatable drum. Waste material is introduced into the cylindrical screen while the drum and the screen are rotating. Coarse material is retained by the cylindrical screen while finer material passes through the cylindrical screen and is received within an annular volume defined between the cylindrical screen and the drum wall. A first material conveyor moves material received within the annular volume to the second end of the rotating drum. A second material conveyor moves material retained by the cylindrical screen to the first end of the rotating drum.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

Figure 1:
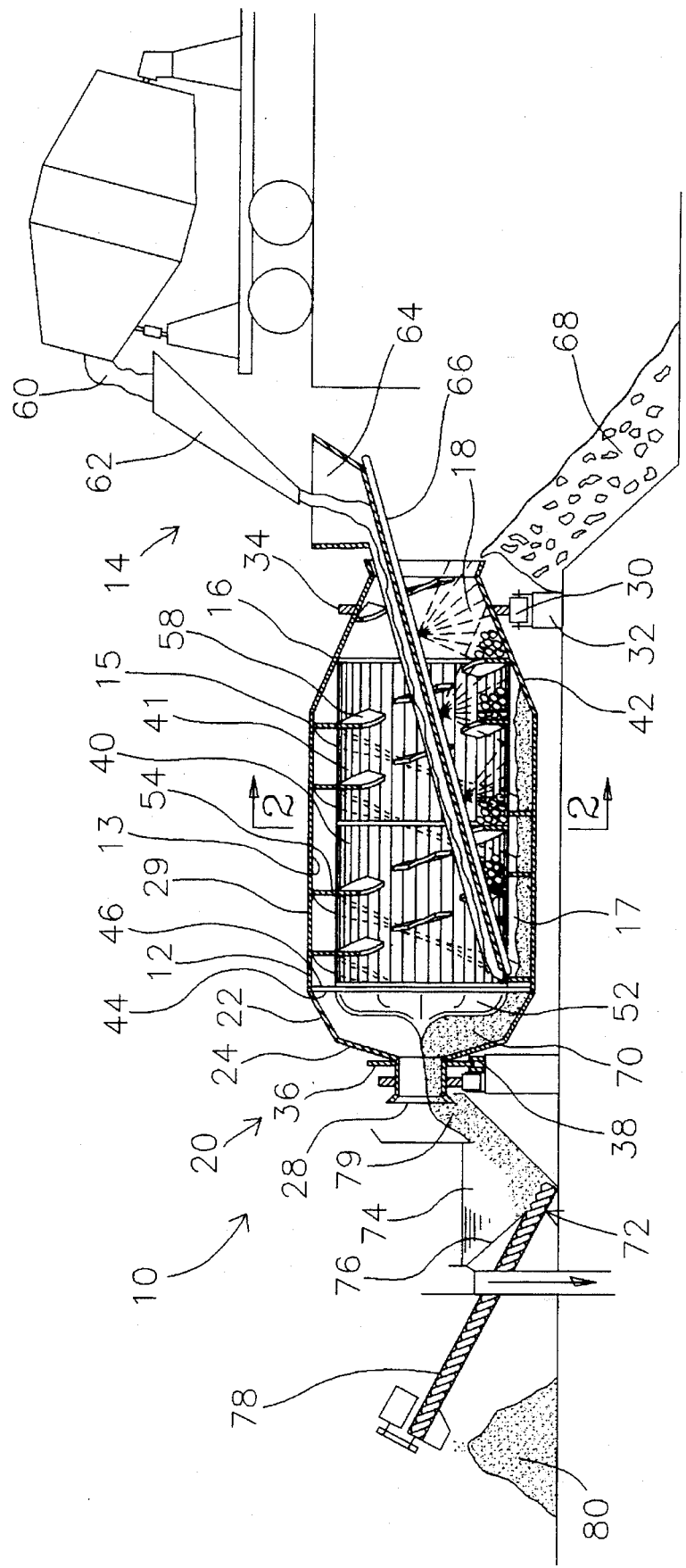
FIG. 1 is a perspective view of the counterflow aggregate recovery apparatus constructed in accordance with several features of the present invention.

A counterflow aggregate recovery apparatus incorporating various features of the present invention is illustrated generally at 10 in the figures. The recovery apparatus 10 is designed to separate and reclaim unused concrete. Moreover, in the preferred embodiment, the recovery apparatus 10 is designed to wash and separate crushed stone conglomerates.

The recovery apparatus 10 is comprised generally of a rotatable drum 12 which receives the waste material 60. The rotatable drum 12 includes a means for separating the fine and coarse aggregates from within wet concrete and further includes first and second material conveyors for respectively moving the fine and coarse aggregates out of the rotatable drum 12.

The rotatable drum 12 defines a generally cylindrical configuration. Typical dimensions for the drum 12 are approximately 96 inches in diameter and 228 inches in length. It will be noted that the dimensions of the drum 12 can vary according to the target capacities of the particular model. In the preferred embodiment, the drum 12 defines a cylindrical section 15 between the first end 14 and the second end 20. The cylindrical section 15 comprises approximately 60% of the total length of the drum 12. The first end 14 defines a conical configuration 16 and an opening 18. In the illustration above, the opening 18 at the first end 14 is approximately 48 inches. The second end 20 defines a conical section 22 terminating in a bulkhead 24 and an annular wall 26 and defines an output opening 28. The output opening 28 at the second end 20 of the drum 12 is approximately 20 inches in diameter in the above embodiment.

It may be preferable to include one or more inspection hatches at various locations on the external portion 29 of the drum 12.

The drum 12 is rotatable via a set of support rollers 30 which support each end 14, 20 of the drum 12, as shown in FIG. 1. Each of the support rollers 30 is powered by a motor 32 which controls the direction of rotation and the rotational speed of the rollers 30. Each of the support rollers 30 contacts a respective bearing track 34 carried by the outer surface 29 of the drum 12. In the preferred embodiment, a first bearing track 34 is secured to the exterior 29 of the drum 12 at the conical section 16 of the first end 14 and a second bearing track 34 is secured to the exterior wall 29 of the drum 12 at the annular wall 26 of the second end 20. With this embodiment, the drum 12 is sufficiently and stably supported. The support rollers 30 and the bearing track 34 are fabricated from a high density, low abrasion material such that the contact between the support rollers 30 and the respective bearing tracks 34 does not erode the support rollers 30 or the bearing tracks 34. In the preferred embodiment, the support rollers 30 and bearing tracks 34 are fabricated from metal or a high density synthetic composition.

It will be noted that the drum 12 may be rotated by other means such as by a belt, a chain or a variation of the support rollers 30. The rotational speed may be changed by either electrical or mechanical means.

It is preferable to include a means for holding the drum 12 in position such that the support rollers 30 remain in contact with the respective bearing track 34. In the preferred embodiment, a flange 36 is secured to the outer surface 29 of the drum 12 at one end, as shown in FIG. 1. The flange 36 is positioned between two lubricated bearing plates 38 such that any horizontal movement of the drum 12 is limited to the distance between the plates 38. Preferably, the two plates 38 are secured to the support roller assembly 32.

Figure 3:
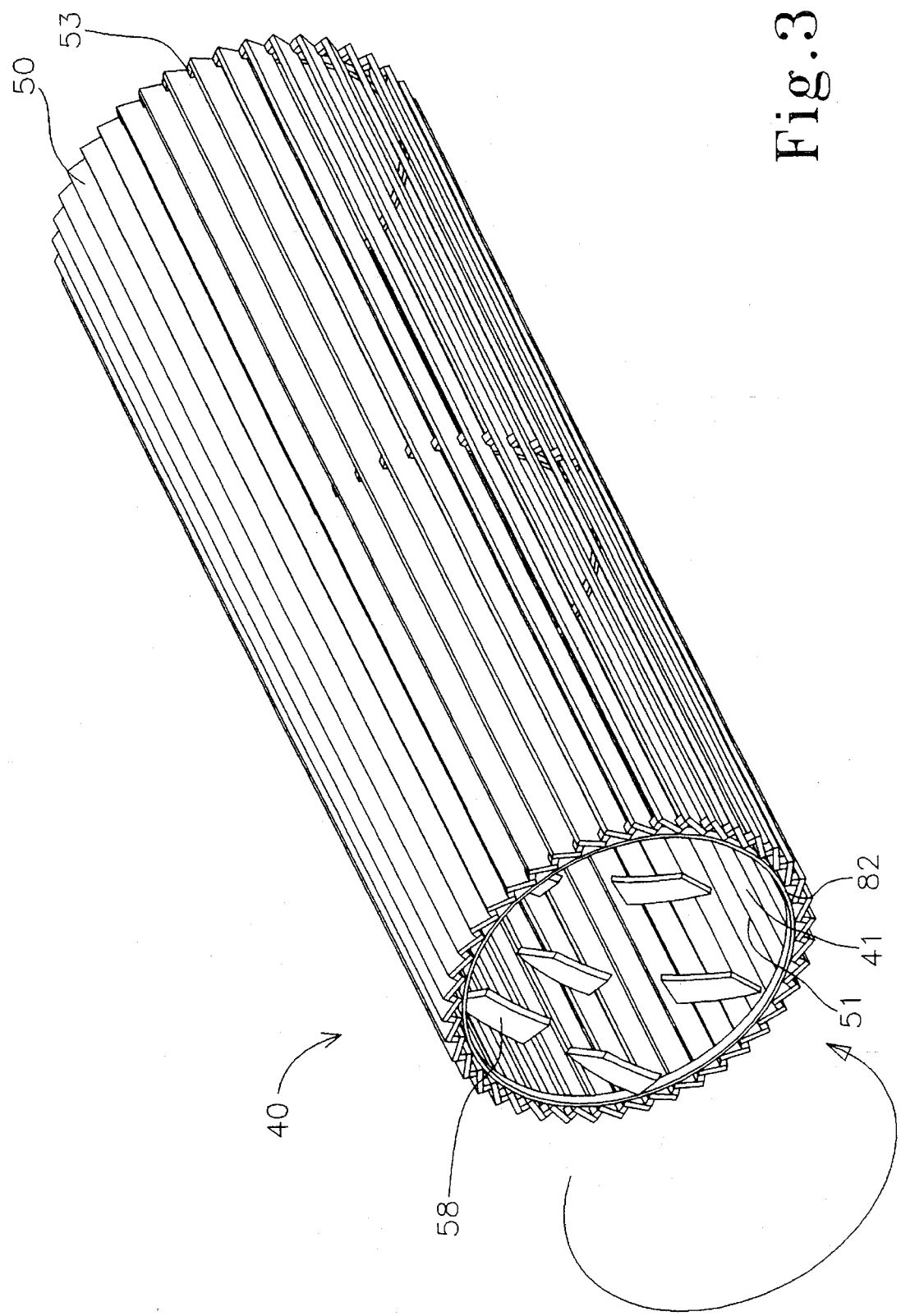
FIG. 3 is a side elevation view of the cylindrical screen showing a portion of the dual helical flight.

A cylindrical screen 40, shown in FIG. 3, is supported within the drum 12. The first end 42 of the cylindrical screen 40 is supported by the conical wall 16 at the first end 14 of the drum 12. The second end 44 of the cylindrical screen 40 is secured to a radial divider wall 46 such that a substantial portion of the screen 40 is suspended within the interior of the drum 12, as shown in FIG. 1. The radial divider wall 46 is secured to the interior wall 13 of drum 12 proximate the conical section 22 at the second end 20. The portion of the divider wall 46 which covers the second end 44 of the cylindrical screen 40 is continuous. A hull 52 is secured to the opposing side of the divider wall 46 and extends toward the second end 20 of the drum 12, as shown in FIG. 1.

Figure 2:
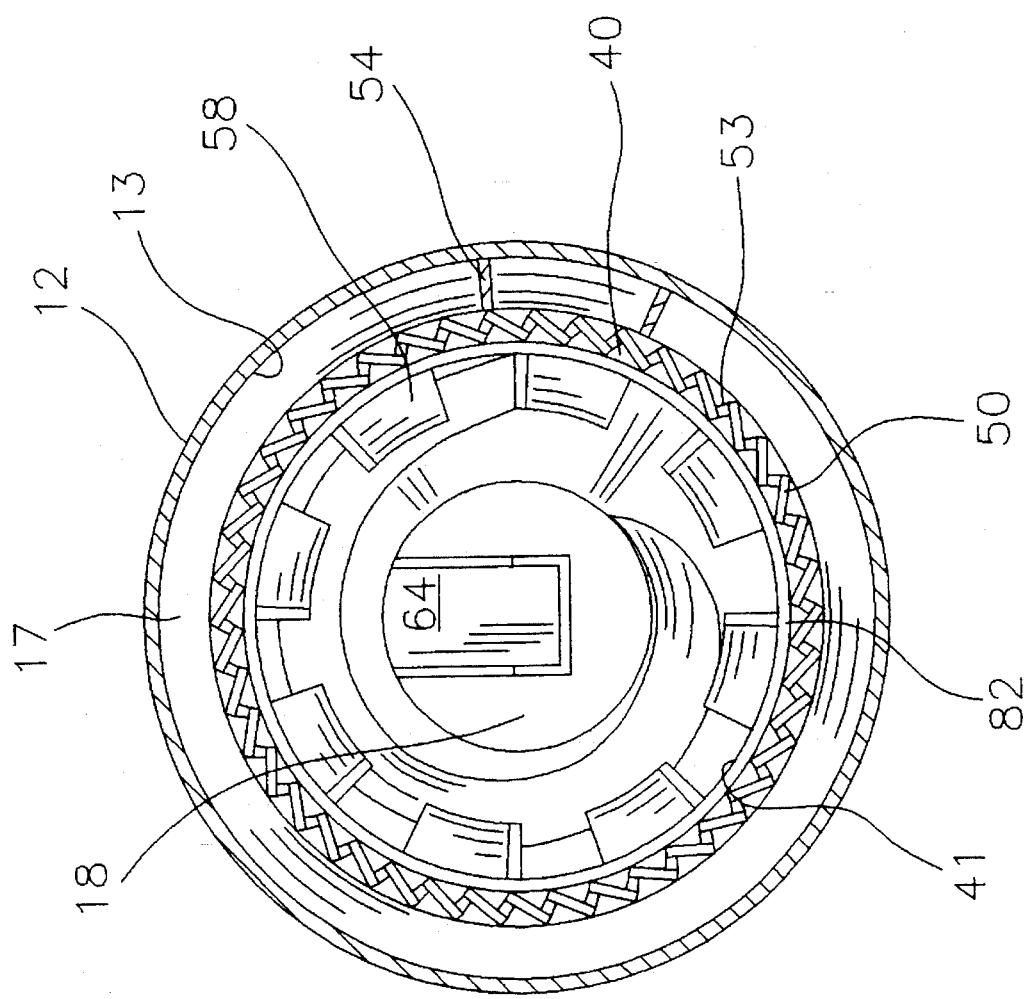
FIG. 2 illustrates a cross sectional view of the recovery apparatus taken at 2—2 of FIG. 1.

The cylindrical screen 20 is constructed of overlapping longitudinal bars 50 which extend in a direction parallel to the axis of rotation of the drum 12. Longitudinal openings are sized according to the separation factor required. The overlapping structure provides a surface upon which material within the rotating cylindrical screen 20 is continuously tumbled. In the preferred embodiment, the cylindrical screen 20 is comprised of a radial frame 82 to which the longitudinal bars 50 are secured. An edge of each bar 50 is tack welded to the frame. A spacer 53 is secured between each successive bar 50 to determine the width of the longitudinal opening 51 between each bar 50, shown most clearly in FIG. 2. The longitudinal openings 51 are sized according to the separation factor.

The drum 12 carries a material conveyor 54 for moving the fine aggregate material 80 along the inner wall 13 of the drum 12 to the second end 20 and discharging the material 80 through the output opening 28 at the second end of 20 the drum 12. The cylindrical screen 40 carries a second material conveyor 58 for moving the coarse aggregate material 68 carried within the cylindrical screen 20 and discharging the material 68 through the opening 18 at the first end 14 of the drum 12. In the preferred embodiment, the inner wall 13 of the the drum 12 carries a first dual helical flight 54 and the inner wall 41 of the cylindrical screen 40 carries a second dual helical flight 58, shown in FIGS. 1 and 2. The helical flights 54, 58 function as an archimedean screw in that the flights move material from one location to another upon rotation of the drum. The first dual helical flight 54 extends between the juncture of the inner wall 13 of the drum 12 and the cylindrical screen 40 at the first end 14 of the drum 12 and the divider wall 46 at the second end 20 of the drum 12. One flight leads the other by 30 degrees. The first dual helical flight 54 is configured to move material received by the inner wall 13 of the drum 12 in the direction from the first end 14 of the drum 12 to the second end 20 of the drum 12.

A substantial portion of the second dual helical flight 58 is secured to the interior wall 41 of the cylindrical screen 40. A portion of the second dual helical flight 58 is secured to the inner wall 13 of the drum 12 at the first end 14 and extends to the second end 44 of the cylindrical screen 40, terminating at the divider wall 46, as shown in FIG. 1. One flight leads the other by 30 degrees. The pitch of the second dual helical flight 58 is opposite that of the first dual helical flight 54 such that material retained within the cylindrical screen 40 is moved in the direction from the second end 44 of the cylindrical screen 40 to the first end 42 of the cylindrical screen 40, and thus the first end 14 of the drum 12. In the preferred embodiment, the portion of the second dual flight 58 within the cylindrical screen 40 has an interrupted structure wherein each of the flights is comprised of a plurality of sections. The flights are continuous between the cylindrical screen 40 and the opening 18 at the first end 14.

The depth of each of the helical flights 54, 58 must be sufficient to hold material and move it along the respective wall when the drum is rotating. It will be noted that the pitch of the each of the dual helical flights can be opposite of that shown in FIG. 1. Of course, with the pitch opposite the drum must rotate in an opposite direction to move the material in the desirable direction.

Waste material 60 to be processed is introduced into the cylindrical screen 40 within the rotating drum 12. The material 60 is preferably introduced at the second end 44 of the cylindrical screen 40 proximate the divider wall 46. As shown in FIG. 1, material 60 is introduced via a receiver hopper 62 and a chute 64. In the preferred embodiment, high velocity water is forced down the chute 64 to facilitate the movement of material 60 down the chute 64 and into the cylindrical screen 40. The high velocity water also serves to wash the finer material 80 from the coarse material 68. The water also serves to suspend the fine material 80, and especially the cement, in a slurry. The finer material 80 is washed through the screen 40 and the slurry and fine material 80 are received within an annular volume 17 defined between the inner wall 13 of the drum 12 and the cylindrical screen 40. The coarse material 68 retained within the cylindrical screen 40 is moved across the screen 40 toward the first end 14 of the drum 12, along the conical portion 16 at the first end 13, and discharged from the opening 18 at the first end 14, via the second dual helical flight 58. In the preferred embodiment, the coarse aggregate material 68 held within the cylindrical screen 40 is washed via a spray bar 66, which is supported by the entry chute 64 within the cylindrical screen 40, such that any fine material 80 not separated from the coarse material 68 during the initial contact with the screen 40 will be washed through the screen 40 by the spray. As shown in FIG. 1, the coarse material 68 is collected outside the drum 12 proximate the first end 13 thereof.

The fine material 80 and slurry received within the annular volume 17 is moved toward the divider wall 46 at the second end 20 of the rotating drum 12 via the first dual helical flight 54 secured to inner wall 13 of the drum 12. The radial divider wall 46 defines a plurality of ports 47 through which the slurry 79 containing the fine aggregate material 80 can pass. The slurry 79 moves into a channel 70 defined by the bulkhead 24 and the hull 52. The channel 70 of decreasing capacity causes the highly fluid slurry 79 to exit the drum 12 with sufficient velocity to reliably carry out all of the fine solid materials 80.

In the preferred embodiment, the slurry 79 is received by a conventional centrifugal separator 72 with a collector vessel 74 defining a shallow conical configuration. The circular flow of the slurry 79 is initiated by the introduction of the slurry 79 from the drum 12. The circular flow is preferably enhanced by injecting water tangent to the vessel wall 76. The larger particulate matter settles to the bottom of the collector vessel 74 while smaller particles remain in suspension. The larger particles that settle out are removed by a dewatering screw conveyor 78. The smaller particles that remain in suspension are ultimately discharged with the overflow from the separator 72. Preferably, the slurry is collected and retained for reuse.

It will be noted that any conventional means for removing the fine aggregate matter 80 from the slurry 79 would be suitable.

From the foregoing description, it will be recognized by those skilled in the art that a counterflow aggregate recovery apparatus offering advantages over the prior art has been provided. Specifically, the recovery apparatus provides a means for reclaiming useable product from waste concrete material. Further, the device provides a means for sorting smaller and larger aggregates. Although a means for reclaiming waste concrete has be disclosed, the apparatus can be utilized to wash and separate stone conglomerates. Further, the stone conglomerates can be classified by changing the cylindrical screen.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A counterflow aggregate recovery apparatus for separating a selected material by size, said apparatus comprising:

a rotatable drum defining a first opening at a first end, a second opening at a second end and an interior wall, said rotatable drum being substantially cylindrical;

a cylindrical screen being suspended within said rotatable drum, said cylindrical screen for receiving a flow of water and the selected material, said cylindrical screen defining openings dimensioned to allow passage of a portion of the selected material which is smaller than said openings whereby the portion of the selected material is received within an annular volume defined between said cylindrical screen and said interior wall, said cylindrical screen thus retaining the portion of the selected material larger than said openings;

a first material conveyor carried by said interior wall of said rotatable drum, said first material conveyor for moving the portion of the selected material received within said annular volume in a direction from said first end of said rotatable drum to said second end of said rotatable drum when said rotatable drum is rotating, said first material conveyor discharging the portion of the selected material received within said annular volume through said second opening of said rotatable drum; and, a second material conveyor carried within said cylindrical screen for moving material retained within said cylindrical screen in the direction from said second end of said rotatable drum to said first end of said rotatable drum when said rotatable drum is rotating, said second material conveyor discharging the material retained within said cylindrical screen through said first opening.

2. The counterflow aggregate recovery apparatus of claim 1 wherein said selected material is wet concrete composed of at least coarse aggregates, fine aggregates, cement and water, said cylindrical screen allowing passage of the fine aggregates, the cement and water, said cylindrical screen retaining the coarse aggregates.

3. The counterflow aggregate recovery apparatus of claim 1 wherein each of said first material conveyor and said second material conveyor includes at least one helical flight, said at least one helical flight of said first material conveyor being secured to said interior wall of said rotatable drum, said at least one helical flight of said second material conveyor being secured to an interior wall of said cylindrical screen, said at least one helical flight of said second material conveyor defining a pitch opposite a pitch defined by said at least one helical flight of said first material conveyor.

4. The counterflow aggregate recovery apparatus of claim 3 wherein each of said first and second material conveyors defines two helical flights, a first of said two helical flights leading a second by 30 degrees.

5. The counterflow aggregate recovery apparatus of claim 1 wherein said first end of said rotatable drum defines a conical configuration and wherein a divider wall is carried by said interior wall proximate said second end, said divider wall extending at least between said interior wall and a second end of said cylindrical screen, a first end of said cylindrical screen being supported in a concentric manner by said first end of said rotatable drum such that said cylindrical screen is substantially suspended within said rotatable drum, said divider wall defining a plurality of ports between said interior wall of said rotatable drum and said cylindrical screen for permitting discharge of the material received within said annular volume.

6. The counterflow aggregate recovery apparatus of claim 5 wherein said second end of said rotatable drum defines a second conical portion, a bulkhead and an annular wall, said annular wall defining said second opening.

7. The counterflow aggregate recovery apparatus of claim 6 further comprising a hull carried by said divider wall proximate said second end of said cylindrical screen, a tapered annular volume being defined between said hull, said second conical portion and said bulkhead.

8. The counterflow aggregate recovery apparatus of claim 1 wherein each of said first end and said second end of said rotatable drum is supported by a support roller assembly including at least one support roller and a support roller motor for controlling the direction of rotation and rotational speed of said at least one support roller.

9. The counterflow aggregate recovery apparatus of claim 8 wherein each of said first end and said second end of said rotatable drum carries a bearing track for engaging said at least one support roller to rotate said rotatable drum.

10. The counterflow aggregate recovery apparatus of claim 1 further including a spray bar disposed within said cylindrical screen for spraying fluid toward the portion of material retained within said cylindrical screen.

11. The counterflow aggregate recovery apparatus of claim 1 wherein said cylindrical screen includes a radial frame, a plurality of longitudinal bars and a plurality of spacers, each of said plurality of longitudinal bars being secured to said radial frame, at least one of said plurality of spacers being secured between each of said plurality of longitudinal bars such that a plurality of longitudinal openings is defined.

12. A counterflow aggregate recovery apparatus for separating a selected material by size, said apparatus comprising:

a rotatable drum defining a first opening at a first end, a second opening at a second end and an interior wall, said rotatable drum being substantially cylindrical, said first end defining a first conical configuration, said interior wall carrying a divider wall proximate said second end;

a cylindrical screen defining a first end and a second end, said first end of said cylindrical screen being supported at said first conical configuration of said rotatable drum, said second end of said cylindrical screen being secured to said divider wall such that said cylindrical screen is substantially suspended within said rotatable drum, said divider wall defining a plurality of ports between said interior wall and said cylindrical screen, said cylindrical screen for receiving a flow of water and the selected material, said cylindrical screen defining openings dimensioned to allow passage of a portion of the selected material which is smaller than said openings whereby the portion of the selected material is received within an annular volume defined between said cylindrical screen and said interior wall, said cylindrical screen thus retaining the portion of the selected material larger than said openings;

a first material conveyor defining at least one helical flight which is carried by said interior wall of said rotatable drum, said first material conveyor for moving the portion of the selected material received within said annular volume in a direction from said first end of said rotatable drum to said second end of said rotatable drum when said rotatable drum is rotating, said first material conveyor discharging the portion of the selected material received within said annular volume through said plurality of ports of said divider wall and said second opening of said rotatable drum; and, a second material conveyor defining at least one helical flight which is secured to an interior wall of said cylindrical screen for moving material retained within said cylindrical screen in the direction from said second end of said rotatable drum to said first end of said rotatable drum when said rotatable drum is rotating, said at least one helical flight of said second material conveyor defining a pitch opposite a pitch defined by said at least one helical flight of said first material conveyor, said second material conveyor discharging the material retained within said cylindrical screen through said first opening, 13. The counterflow aggregate recovery apparatus of claim 12 wherein said selected material is wet concrete composed of at least coarse aggregates, fine aggregates, cement and water, said cylindrical screen allowing passage of the fine aggregates, the cement and water, said cylindrical screen retaining the coarse aggregates.

14. The counterflow aggregate recovery apparatus of claim 12 wherein each of said first and second material conveyors defines two helical flights, a first of said two helical flights leading a second by 30 degrees.

15. The counterflow aggregate recovery apparatus of claim 12 wherein said second end of said rotatable drum defines a second conical portion, a bulkhead and an annular wall, said annular wall defining said second opening.

16. The counterflow aggregate recovery apparatus of claim 15 further comprising a hull carried by said divider wall proximate said second end of said cylindrical screen, a tapered annular volume being defined between said hull, said second conical portion and said bulkhead.

17. The counterflow aggregate recovery apparatus of claim 12 wherein each of said first end and said second end of said rotatable drum is supported by a support roller assembly including at least one support roller and a support roller motor for controlling the direction of rotation and rotational speed of said at least one support roller.

18. The counterflow aggregate recovery apparatus of claim 17 wherein each of said first end and said second end of said rotatable drum carries a bearing track for engaging said at least one support roller to rotate said rotatable drum.

19. The counterflow aggregate recovery apparatus of claim 12 further including a spray bar disposed within said cylindrical screen for spraying liquid toward the portion of material retained within said cylindrical screen.

20. The counterflow aggregate recovery apparatus of claim 12 wherein said cylindrical screen includes a radial frame, a plurality of longitudinal bars and a plurality of spacers, each of said plurality of longitudinal bars being secured to said radial frame, at least one of said plurality of spacers being secured between each of said plurality of longitudinal bars such that a plurality of longitudinal openings is defined.

21. A method for reclaiming aggregates of varying sizes from a concrete mixture comprising:

introducing water into a cylindrical screen to create a turbulent flow;

introducing the concrete mixture into said cylindrical screen, the concrete mixture including at least coarse aggregates, fine aggregates, cement and water;

retaining the coarse aggregate within said cylindrical screen, the fine aggregate, cement and water passing to an annular volume between said cylindrical screen and a rotatable drum, the cement being suspended in the water thereby forming a slurry;

conveying the coarse aggregate toward a first end of said rotatable drum and through a first outlet;

conveying the fine aggregate and slurry toward a second end of said rotatable drum and through a second outlet;

removing the fine aggregate from the fine aggregate and slurry mixture via a conventional centrifugal separator; and collecting the slurry for reuse.

* * * * *